United States Patent
Kersey et al.

(10) Patent No.: US 6,285,806 B1
(45) Date of Patent: Sep. 4, 2001

(54) COHERENT REFLECTOMETRIC FIBER BRAGG GRATING SENSOR ARRAY

(75) Inventors: Alan D. Kersey, So. Glastonbury, CT (US); Anthony Dandridge, Burke, VA (US); Sandeep T. Vohra, Crofton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/093,827

(22) Filed: May 31, 1998

(51) Int. Cl.$^7$ ........................................................ G02B 6/00
(52) U.S. Cl. .................................................. 385/12; 385/13
(58) Field of Search .................. 385/12, 13; 250/227.14, 250/227.23

(56) References Cited

U.S. PATENT DOCUMENTS

| | | |
|---|---|---|
| H1626 * | 1/1997 | Kersey ................................. 370/479 |
| 3,633,183 * | 1/1972 | Cobb ..................................... 340/173 |
| 4,775,216 | 10/1988 | Layton . |
| 4,778,248 | 10/1988 | Arzur et al. . |
| 4,889,986 | 12/1989 | Kersey et al. . |
| 5,144,690 | 9/1992 | Domash . |
| 5,208,877 | 5/1993 | Murphy et al. . |
| 5,323,404 | 6/1994 | Grubb . |
| 5,436,988 | 7/1995 | Narendran . |
| 5,973,317 * | 10/1999 | Hay .................................. 250/227.14 |
| 5,987,197 * | 11/1999 | Kersey .................................. 385/24 |

FOREIGN PATENT DOCUMENTS

| | | |
|---|---|---|
| 2189880 | 11/1987 | (GB) . |
| 2214636 | 9/1989 | (GB) . |

* cited by examiner

*Primary Examiner*—Teresa M. Arroyo
*Assistant Examiner*—Gioacchio Inzirillo
(74) *Attorney, Agent, or Firm*—John J. Karasek; Sally A. Ferrett

(57) ABSTRACT

A fiber optic sensor array has multiple segments, each capable of detecting a physical condition such as an acoustic wave. The segments are separated by weak reflectors such as fiber optic Bragg gratings. Light from a light source is input into the input end of the array. Light reflected by each of the reflectors has a phase shift representing the effects of the physical condition on all of the segments from the input end to that reflector. To address a specific reflector, the return light is demultiplexed. This demultiplexing is done by modulating the light input into the input end of the array with a pseudo-random bit sequence and correlating the output with a time-shifted version of the pseudo-random bit sequence to isolate the part of the output caused by that reflector. To address a specific segment, the phase shifts from two adjacent reflectors are determined. The return light can be strengthened by mixing it with a portion of the light picked off from the light source.

22 Claims, 3 Drawing Sheets

COHERENT REFLECTOMETRIC FIBER BRAGG GRATING SENSOR ARRAY

FIELD OF THE INVENTION

The present invention is directed to an interferometric sensor array which provides a large number of individually addressable sensor locations with high spatial accuracy and in particular to such an array as applied for detection of acoustic or other vibrations, disturbance or the like.

DESCRIPTION OF RELATED ART

It is known in the art to form a sensor array by providing an optical fiber with multiple sensing segments separated by weakly reflecting portions such as fiber Bragg grating reflectors. The sensing segments undergo a change in refractive index in response to a physical condition to be detected, such as stress, strain or sound. Typically, one short light pulse is sent into the fiber, and the time delay of the return pulse identifies the weakly reflecting portion which reflected the return pulse. The weakly reflecting portions are spaced far enough apart that the propagation time between them is at least equal to the width of the short light pulse. Propagation time is in turn determined by the speed of light in a fiber, which is given by c/n, where c is the speed of light in a vacuum, and n is the index of refraction of the fiber. For many commercially available optical fibers, n≈1.5.

Concepts relating to such sensor arrays are set forth in detail in the following references:

U.S. Pat. No. 4,775,216 to Layton, Oct. 4, 1988;

U.S. Pat. No. 4,778,248 to Arzur et al, Oct. 18, 1988;

U.S. Pat. No. 4,889,986 to Kersey et al, Dec. 26, 1989;

U.S. Pat. No. 5,144,690 to Domash, Sep. 1, 1992;

U.S. Pat. No. 5,208,877 to Murphy et al, May 4, 1993;

U.S. Pat. No. 5,323,404 to Grubb, Jun. 21, 1994;

U.S. Pat. No. 5,436,988 to Narendran, Jul. 25, 1995;

U.K. Published Patent Application 2,189,880 A to Lamb, published Nov. 4, 1987;

U.K. Published Patent Application 2,214,636 A to Lamb, published Sep. 6, 1989; and H. S. Al-Raweshidy et al, Spread spectrum technique for passive multiplexing of interferometric optical fiber sensors, *SPIE Vol.* 1314 *Fibre Optics* 90, pp. 342–7.

Pseudo-random bit sequences (PRBS's) are known in such arts as radar and code-division multiple-access (CDMA) communication systems. An important characteristic of a PRBS is that it comprises a plurality of segments, each of which can be easily distinguished from the others. This characteristic allows demultiplexing by correlation. The characteristics of PRBS's have been explored in detail in Sarwate et al, Crosscorrelation Properties of Pseudorandom and Related Sequences, *Proceedings of the IEEE,* Vol. 68, No. 5, May, 1980, pp. 593–620.

FIG. 1 shows a schematic diagram of a known interferometric sensor array using code-division multiplexing. In sensor array 100, laser 102 emits coherent light. Pseudo-random bit sequence (PRBS) generator 104 generates a pseudo-random bit sequence, which is input to modulator 106. Modulator 106 modulates the coherent light from laser 102 to produce PRBS optical input 108. PRBS optical input 108 is input to fiber 110. Fiber 110 includes N sensors 112-1, 112-2, 112-3, . . . , 112-N separated by lengths of fiber 114-1, 114-2, . . . , 114-(N−1).

Each sensor 112-1, 112-2, 112-3, . . . , except last sensor 112-N, includes a corresponding first coupler 116-1, 116-2, . . . , 116-(N−1), which splits off a portion of the light flux of PRBS optical input 108 in fiber 110. In each detector 112-n, n=1, 2, . . . , N, the split-off portion of the light enters second coupler 118-n, which divides the flux between first fiber 120-n and second fiber 122-n, the first and second fibers having equal optical lengths. First fiber 120 undergoes a change in its refractive index when exposed to the condition to be sensed (e.g., such measurands as an acoustic wave, temperature change, distension because of stress or strain, etc.), while second fiber 122 undergoes no such change. The fluxes are recombined in third coupler 124, where they interfere to produce PRBS output signal 130-1, . . . , 130-N. Each PRBS output signal is time-delayed by the total length of fiber between laser 102 and the corresponding third coupler 124-n. Fourth coupler 126-n couples the PRBS output signal to return fiber 128. Last sensor 112-N has the same construction as the other sensors, except that first coupler 116 and last coupler 126 are unnecessary. PRBS output signals 130-1, . . . , 130-N add in return fiber 128 to produce total output 132. Total output 132 is detected by detector 134.

Total output signal 132 must be demultiplexed to rederive each of the PRBS output signals. To effect this demultiplexing, time delay circuit 136 receives the PRBS from PRBS generator 104 and applies a time delay to the PRBS corresponding to the time delay of each PRBS output signal. The time-delayed PRBS is correlated with the output of detector 134 in correlation circuit 138. The result of the correlation is applied through low-pass filter (LPF) 140 to reduce high frequency noise, and is output at sensor array 100. Thus, each sensor is addressable.

However, sensor array 100 has the following drawbacks. First, because sensor array 100 requires four couplers for each sensor except the last and also requires return fiber 128, sensor array 100 is complicated and expensive to build. Second, because of the length of the fibers required and imperfect transmission in any real-world optical fiber, sensor array 100 suffers from a significant loss of light flux. A particular disadvantage arising from such a loss is a limitation on the number of sensors.

SUMMARY OF THE INVENTION

An object of the invention is to reduce number of sensors necessary to do remote sensing, e.g. of the kind done by the apparatus of FIG. 1.

Another object is to reduce amount of optical fiber necessary to do remote sensing such as is done by the apparatus of FIG. 1.

Another object is to provide an optical fiber sensor array which has a simple design and is inexpensive to build.

To achieve these and other objects, the present invention concerns an optical system and method employing an optical fiber with a plurality of partially reflective elements, an optical source to launch an optical signal into the fiber, and a phase detector disposed effective to determine the phase between the optical signal and light reflected from at least one preselected element. By using reflected light, the invention requires less optical fiber for the same number of sensors because the invention need not employ an additional return line, such as line 128 of FIG. 1. Moreover, because the invention uses reflected light, rather than plural sensor taps (e.g. sensors 120-n in FIG. 1), it can dispense with the numerous couplers needed in each of these taps, saving on hardware, and the inherent lossyness of such couplers. Consequently, the invention provides an improved optical budget for the user, permitting a larger number of sensors for the same optical power, and permits one to do so with a simpler apparatus using less hardware.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

A preferred embodiment of the present invention will now be set forth in detail with reference to the drawings, in which.

DETAILED DESCRIPTION OF THE PREFERRED EMBODIMENT

Figure 1:
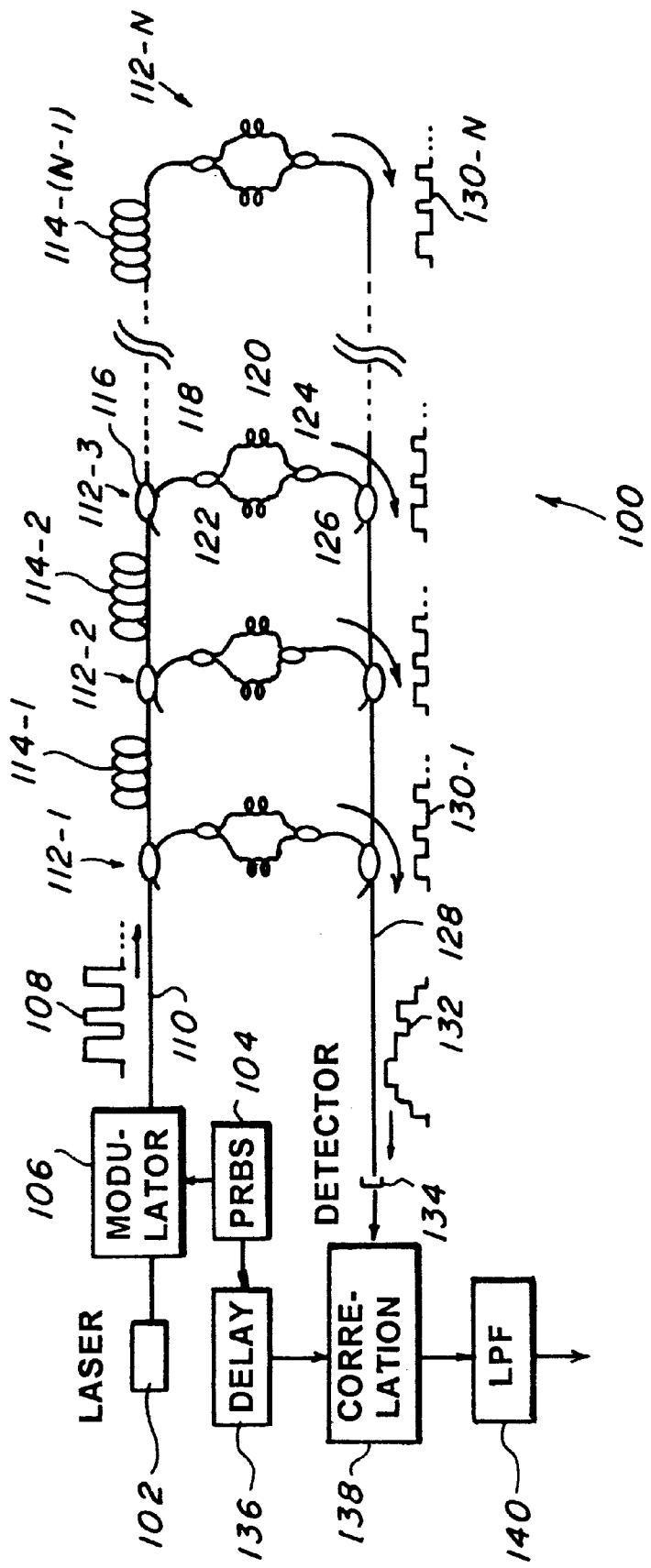
FIG. 1 shows a schematic diagram of a fiber sensor array according to the prior art.
Figure 2:
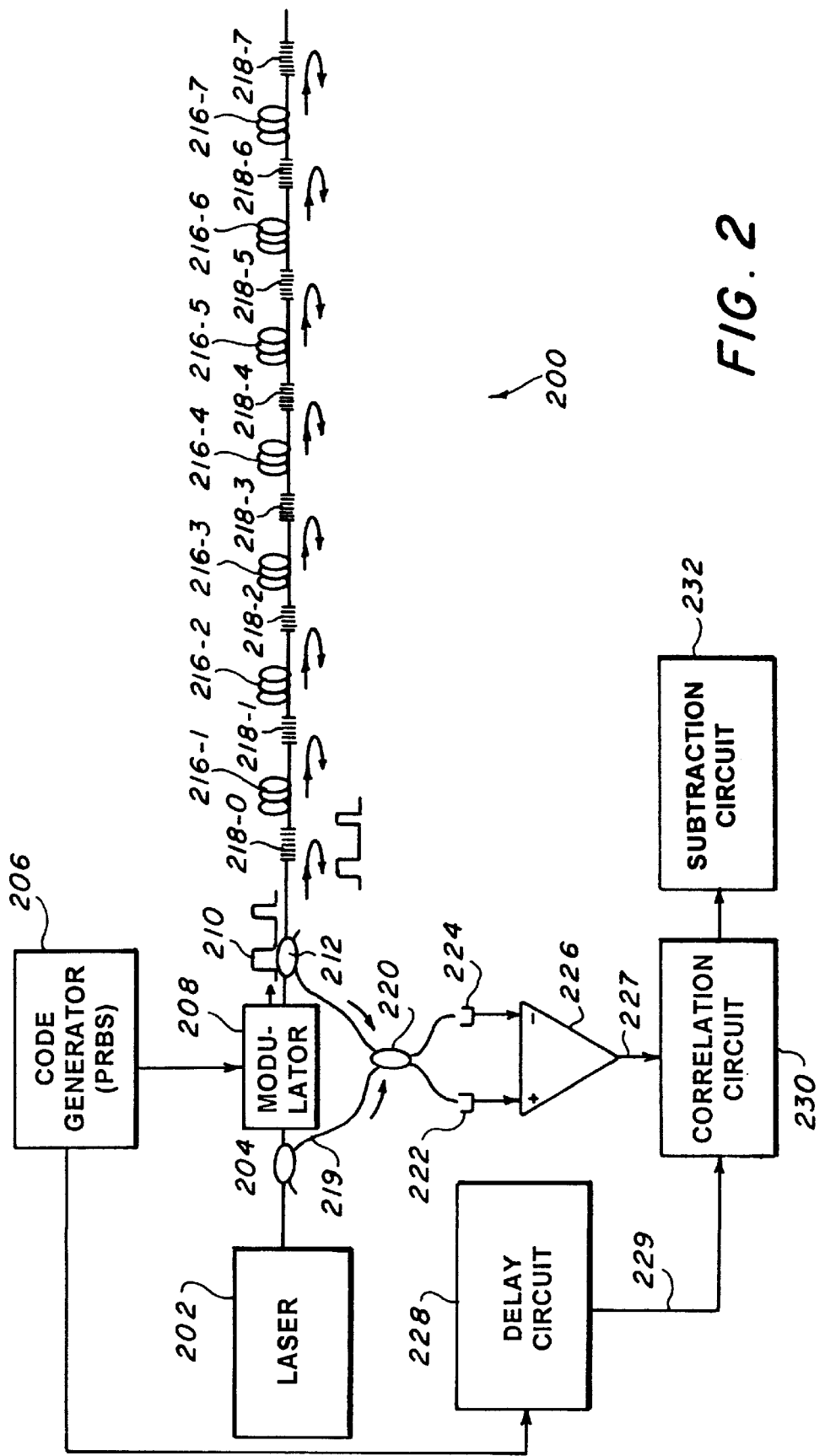
FIG. 2 shows a schematic diagram of a fiber sensor array according to the invention.

FIG. 2 shows a schematic diagram of a fiber sensor array 200 according to the invention, in which laser 202 emits light having a long coherence length and a narrow wavelength range. The light emitted by laser 202 passes through coupler 204, which splits the flux into a first portion directed to modulator 208, and a second portion 219. The use of second portion 219 will be explained below with regard to detection. Pulse modulator 208 modulates the flux with a PRBS generated by PRBS generator 206 to produce PRBS optical signal 210. Phase modulator 208 can be an electro-optical switch or the like. The PRBS can be a maximal or M-sequence code of the type known in the radar and communication arts. PRBS optical signal 210 passes through coupler 212 into fiber 214, which has a series of coils 216-1, 216-2, 216-3, 216-4, 216-5, 216-6, 216-7, . . . , 216-N (of which FIG. 2 shows only coils 1 through 7), bounded by weak Bragg grating reflectors 218-0, 218-1, 218-2, 218-3, 218-4, 218-5, 218-6, 218-7, . . . , 218-N (of which FIG. 2 shows only gratings 0 through 7). Each coil acts as a sensor by undergoing a change in its refractive index in accordance with a condition to be sensed (e.g., an acoustic wave, etc., as discussed above). Bragg grating reflectors 218-0, 218-1, 218-2, . . . can be replaced by photo-induced index steps which provide weak Fresnel reflections, or by any known type of refractive-index fiber anomaly.

Each weak Bragg grating reflector 218-0, 218-1, 218-2, . . . reflects a small portion of the light flux incident on it. The sum of the reflected light fluxes is received by coupler 212 and directed thereby to coupler 220. Coupler 220 also receives second portion 219 of the light flux split off by coupler 204. In coupler 220, the second portion of the flux from coupler 204 is coherently mixed with the reflected light from coupler 212. The optics disposed between couplers 204 and 220 effectively constitute a Mach-Zender interferometer, with fiber 214 constituting one arm, and optical path 219 constituting the other. Optical signals in the two arms recombine in output 220, the resultant output signal depending on the relative phase between the signals from the arms, as is known to those skilled in the art.

Transducers 222, 224 covert the output of coupler 220 to electric signals, which in turn are directed to respective inputs of difference amplifier 226. Amplifier 226 differentially detects the interferometer's output, again in a manner known to those skilled in the art. The net result of this interferometric configuration is an output 27 representing the signal reflected from Bragg gratings 218, with the optical carrier from laser 208 removed. The signal 228, which initially modulates the optical carrier, is fed in via delay 228 to correlator 230. The dimensions of fiber 214 are chosen such that the round trip optical path from coupler 212 to any Bragg grating 216 and back to coupler 212 is longer than any change in optical path length along the same round trip path due to changes in fiber segments 216 therealong responsive to expected measurands. Thus, no reflection from any of Bragg gratings 218 will "lap," or overlap, a reflection from any other. Consequently, signals reflected from each of the Bragg gratings 218 will arrive at correlator 230 sequentially, each within a known time window uniquely associated with a specific grating, albeit shifted within that window by any measurand induced change in optical path. The delay imposed by member 228 is preferably chosen to correspond to the round trip travel time of an optical signal from modulator 208 to one selected Bragg grating and back to detector 226. The delay imposed by member 228 can thus "target" a particular Bragg grating by causing the delayed modulation signal 229 to arrive at correlator 230 within the time window associated with that grating. Correlator 230 performs a correlation over the span of the time window, determines in a known manner the time shift between signals 227 and 229 which maximizes the correlation, thereby determining the phase between the two signals, from which one can infer the phase shift induced by fiber segments 216 which signal 227 traversed in its round trip within fiber 214.

As an example, upon light from laser 202 modulated by member 206 entering fiber 214, Bragg grating 218-4 reflects a portion of the input light which, to get to grating 218-4, traverses fiber segments 216-1, 216-2, . . . , 218-4. Any change in optical path length in these segments changes the time of flight of the light reflected from grating 218-4, with the result that the total phase shift of light reflected from grating 218-4 will be the sum of the individual phase shifts imposed by each of the fiber segments. Setting the delay of member 228 to place delayed modulation signal 229 at correlator 230 within the time window associated with grating 218-4 ensures that the demodulated signal reflected from grating 216-4, and the modulation signal delayed by member 228, will both arrive at correlator 230 within the time window. Correlator 230 then determines the phase difference between the two signals, i.e. the phase shift which maximizes the correlation between the two signals, thereby determining the phase between signals 227 and 229. Because one would know a priori what the phase difference would be absent measurand changes in optical path length in fiber segments 216-1 . . . 216-4, one can determine the cumulative change in optical path which has occurred in these segments, e.g. responsive to measurands.

Figure 3:
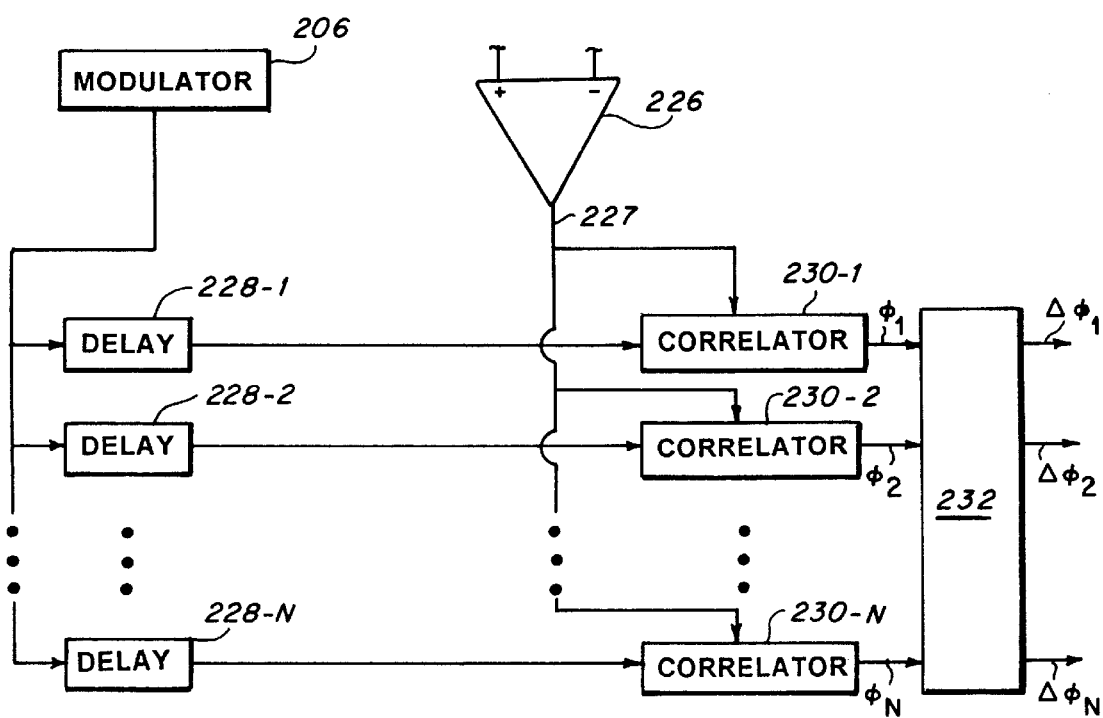
FIG. 3 shows a schematic diagram of another embodiment of the invention.

If, in this example, one knew a priori the phase shift associated with all but one of fiber segments 216-1 . . . 216-4, and one wished to determine the phase shift of that last segment, subtractor 232 preferably would subtract the known phase shifts from the cumulative phase detected by correlator 230. Preferably, however, this would be done in the manner illustrated in FIG. 3, which shows apparatus identical to that of FIG. 2, except that in place of delay 228 and correlator 230, there are N delay-correlator pairs denominated 228-n and 230-n, n=1, 2, . . . , N, having corresponding outputs $\phi_1, \phi_2, \ldots, \phi_N$, in which $\phi_n$ is the cumulative phase induced on a signal reflected from the nth Bragg grating. Subtractor 232 receives this phase information, and determines $\Delta\phi_n = \phi_n - \phi_{n-1}$, i.e. the phase shift induced by fiber segment 218-n alone.

Other techniques can be used to isolate a particular sensor. For example, the interferometer signal can be demodulated by using heterodyne processing by inserting an optical frequency shifter in the path of the second portion of the flux split off by coupler 204. Alternatively, a phase-generated carrier (PGC) approach can be used by inserting a phase modulator in the path of the second portion of the flux.

A large number of sensors can be interrogated if the reflectivity of the Bragg reflectors is sufficiently low. For example, if each Bragg reflector has a reflectivity of 0.1%, more than one hundred reflectors can be used in series. For a 10 mW laser beam launched into the system with an effective duty cycle of 50% from the PRBS modulation, the average optical power at the detectors from the reflectors is ~1 $\mu$W. Coherent mixing of this signal in coupler 220 with a split-off light flux of ~1 Mw produces a detector signal with a shot-noise limited performance of ~$10^{-6}$ rad/Hz. Rayleigh scattering in ~20 m fiber sections between the reflectors produces a stray reflection component whose average power is ~10 Nw. This component also produces a weak interfering component which is largely masked by the component derived by the Bragg reflectors. The use of low-reflectivity gratings also reduces crosstalk effects.

In practice, modulator 206 can be any known optical, or electro-optical, modulation device, and delay 228, correlator 230, subtractor 230, demodulator 220, and detector 226 can be any optical or electric-circuit device known to operate as above described. The modulation signal is preferably a pseudorandom pulse code because such a code will correlate especially poorly with noise, and, as disucssed above, such codes are well known. However, any non-random modulation could in principle be used. In particular, all circuitry downstream of fiber 224 could be constituted by a digital computer adapted to digitally sample an analog input, although differential detection such as is done by amplifier 226 is preferred to cancel noise and otherwise increase signal to noise performance of the detector. Indeed, the choice of hardware is determined largely by the hardware's response time compared with optical time of flight between Bragg gratings 218, choice of which is within the skill of workers in this field once otherwise informed by the foregoing.

While a preferred embodiment has been set forth, those skilled in the art who have reviewed this disclosure will appreciate that modifications can be made within the scope of the invention. In addition to the modifications described above, several interrogating lasers can be used to address arrays of Bragg gratings, which can have the same wavelength sensitivity or different wavelength sensitivities (such as 1.55 $\mu$m and 1.2 $\mu$m). Also, laser 202 can be replaced by a broad-band optical source. Modifications disclosed separately can be combined whenever it is technologically feasible to do so. Therefore, the invention should be construed as limited only by the appended claims.

We claim:

1. A fiber optic sensor array for detecting a physical condition, the fiber optic sensor array comprising:
   bit sequence generating means for generating a pseudo-random bit sequence;
   light source means, receiving the pseudo-random bit sequence, for emitting a light beam which is modulated in accordance with the pseudo-random bit sequence;
   an optical fiber disposed to receive the light beam so that the light beam propagates in the optical fiber in a first direction, the optical fiber comprising a plurality of fiber segments disposed in series, each of the plurality of fiber segments having an optical characteristic which varies in accordance with the physical condition, the fiber segments being separated by means for weakly reflecting portions of the light beam to form return optical signals which propagate in the optical fiber in a second direction which is opposite to the first direction, each of the return optical signals representing an effect of the physical condition on the light beam;
   photodetecting means, receiving the return optical signals, for producing a photodetector output which represents a sum of the return optical signals;
   time delay means, receiving the pseudo-random bit sequence, for producing a time-delayed pseudo-random bit sequence, said time delay means comprising means for producing a plurality of time delayed pseudo-random bit sequences, each having a different time delay;
   correlating means, receiving the time-delayed pseudo-random bit sequence and the photodetector output, for performing a correlation between the time-delayed pseudo-random bit sequence and the photodetector output to produce a correlation result representing one of the return optical signals, said correlating means comprising means for receiving a plurality of time-delayed pseudo-random bit sequences, for producing a plurality of correlations to produce a plurality of correlation results, each representing a different one of the return optical signals; and
   subtracting means, receiving the plurality of correlation results, for calculating a difference between two of the return optical signals to determine an effect on the light beam by one of the fiber segments.

2. A fiber optic sensor array as in claim 1, wherein each of the reflecting means comprises a fiber optic Bragg grating formed in the optical fiber.

3. A fiber optic sensor array as in claim 1, wherein the light source means comprises:
   a laser for emitting light; and
   a modulator, receiving the light emitted by the laser and the pseudo-random bit sequence, for modulating the light emitted by the laser in accordance with the pseudo-random bit sequence to produce the light beam.

4. A fiber optic sensor array as in claim 3, wherein the modulator comprises an electro-optic switch.

5. A fiber optic sensor array as in claim 3, wherein:
   the light source means further comprises a first coupler, disposed in a path of the light emitted by the laser between the laser and the modulator, for picking off a portion of the light emitted by the laser;
   the optical fiber further comprises a second coupler for picking off portions of the return optical signals; and
   the photodetecting means further comprises:
   a third coupler for coherently mixing the portion of the light picked off by the first coupler with the portions of the return optical signals picked off by the second coupler; and
   means for detecting a result of coherent mixing by the third coupler.

6. A fiber optic sensor array as in claim 5, wherein:
   the result of coherent mixing comprises two outputs of the third coupler; and the means for detecting comprises a pair of photodetectors, each detecting one of the two outputs of the third coupler.

7. A fiber optic sensor array as in claim 6, wherein the means for detecting further comprises a differential amplifier, receiving outputs of the pair of photodetectors, for producing a balanced detector output.

8. A method of detecting a physical condition, the method comprising:

(a) generating a pseudo-random bit sequence;

(b) emitting a light beam which is modulated in accordance with the pseudo-random bit sequence;

(c) causing the light beam to enter an optical fiber so that the light beam propagates in the optical fiber in a first direction, the optical fiber comprising a plurality of fiber segments disposed in series, each of the plurality of fiber segments having an optical characteristic which varies in accordance with the physical condition, the fiber segments being separated by means for weakly reflecting portions of the light beam to form return optical signals which propagate in the optical fiber in a second direction which is opposite to the first direction, each of the return optical signals representing an effect of the physical condition on the light beam;

(d) receiving the return optical signals and producing a photodetector output which represents a sum of the return optical signals;

(e) producing a time-delayed pseudo-random bit sequence by producing a plurality of time-delayed pseudo-random bit sequences, each having a different time delay;

(f) performing a correlation between the time-delayed pseudo-random bit sequence and the photodetector output to produce a correlation result representing one of the return optical signals by performing a plurality of correlations to produce a plurality of correlation results, each representing a different one of the return optical signals; and (g) calculating a difference between two of the return optical signals to determine an effect on the light beam by one of the fiber segments.

9. A method as in claim 8, wherein each of the reflecting means comprises a fiber optic Bragg grating formed in the optical fiber.

10. A method as in claim 8, wherein step (b) comprises:

(i) emitting light; and (ii) modulating the light emitted in step (b) (i) in accordance with the pseudo-random bit sequence to produce the light beam.

11. A method as in claim 10, wherein step (b) (ii) comprises modulating the light emitted in step (b)(i) with an electro-optic switch.

12. A method as in claim 10, wherein:

step (b) further comprises picking off a portion of the light emitted by the laser; and step (d) further comprises:

(i) picking off portions of the return optical signals from the optical fiber;

(ii) coherently mixing the portion of the light picked off in step (b) with the portions of the return optical signals picked off in step (d)(i); and (iii) detecting a result of the step of coherently mixing.

13. A method as in claim 12, wherein:

the result of the step of coherently mixing comprises two outputs; and step (d)(iii) comprises detecting each of the two outputs to produce an output signal.

14. A method as in claim 13, wherein step (d) further comprises producing a balanced detector output in accordance with the output signals.

15. An optical monitoring system, comprising:

an optical coupler, said fiber comprising a plurality of partially reflective and partially transmissive elements;

an optical source disposed to launch an input signal into said fiber;

a coupler in said fiber disposed to receive signal reflected from said elements; and a detector effective, responsive to said coupler, to determine the phase of at least a portion of said signal reflected from at least one of said elements, said detector comprising a correlator disposed to correlate said input signal with said at least a portion of said signal reflected from said at least one element.

16. The system of claim 15, wherein:

said optical source comprises:

means for generating an optical carrier; and a modulator disposed to impose a modulation signal on said carrier;

wherein said detector comprises a demodulator disposed to remove said carrier from said at least a portion of said signal reflected from said at least one of said elements, effective to produce a demodulated signal;

wherein said correlator is disposed effective to correlate said demodulated signal and said modulation signal.

17. The system of claim 15, wherein said at least one of said elements is a member of the group consisting of: Bragg gratings, Fresnel reflectors; preselected anomalies in the refractive index of said fiber.

18. The system of claim 15, wherein said at least one of said elements is a Bragg grating.

19. An optical system comprising:

an optical fiber comprising a plurality of partially reflective elements;

an optical source disposed to launch an optical signal into said fiber;

a phase detector disposed effective to determine the phase between said optical signal and light reflected from a preselected one of said elements, said phase detector comprising a correlation means; and a subtractor means for subtracting known phase shifts from a cumulative phase detected by said correlation means, thereby detecting a phase shift induced by a preselected one of said elements.

20. A fiber optic sensor array for detecting a physical condition, the fiber optic sensor array comprising:

bit sequence generation means for generating a pseudo-random bit sequence;

light source means, receiving the pseudo-random bit sequence, for emitting a light beam which is modulated in accordance with pseudo-random bit sequence, the light source comprising:

a laser for emitting light;

a modulator;

a first coupler, disposed in a path of the light emitted by the laser between the laser and the modulator, for picking off a portion of the light emitted by the laser;

an optical fiber disposed to receive the light beam so that the light beam propagates in the optical fiber in a first direction, the optical fiber comprising a plurality of fiber segments disposed in series, each of the plurality of fiber segments having an optical characteristic which varies in accordance with the physical condition, the fiber segments being separated by means of weakly reflecting portions of the light beam to form return optical signals which propagate in the optical fiber in a second direction which is opposite to the first direction, each of the return optical signals representing an effect of the physical condition on the light beam, the optical fiber further comprises a second coupler for picking off portions of the return optical signals;

photodetecting means for producing a photodetector output which represents a sum of the return optical signals, the photodetecting means further comprises:

a third coupler for coherently mixing the portion of the light picked off by the first coupler with the portions of the return optical signals picked off by the second coupler; and means for detecting a result of coherent mixing by the third coupler; time delay means for producing a time-delayed pseudo-random bit sequence; and correlating means for performing a correlation between the time-delayed pseudo-random bit sequence and the photodetector output to produce a correlation result representing one of the return optical signals.

21. A method of detecting a physical condition, the method comprising:

(a) generating a pseudo-random bit sequence;

(b) emitting a light beam which is modulated in accordance with the pseudo-random bit sequence to produce the light beam, and wherein step(b) further comprises picking off a portion of the light emitted by the laser;

(c) causing the light beam to enter an optical fiber so that the light beam propagates in the optical fiber in a first direction, the optical fiber comprising a plurality of fiber segments disposed in series, each of the plurality of fiber segments having an optical characteristic which varies in accordance with the physical condition, the fiber segments being separated by means for weakly reflecting portions of the light beam to firm return optical signals which propagate in the optical fiber in a second direction which is opposite to the first direction, each of the return optical signals representing an effect of the physical condition on the light beam;

(d) receiving the return optical signals and producing a photodetector output which represents a sum of the return optical signals, and wherein step(d) further comprises (i) picking off portions of the return optical signals;
(ii) coherently mixing the portion of the light picked off in step(b) with the portions of the return optical signals picked off in step(d)(i); and
(iii) detecting a result of the step of coherently mixing;

(e) producing a time-delayed pseudo-random bit sequence; and (f) performing a correlation between the time-delayed pseudo-random bit sequence and the photodetector output to produce a correlation result representing one of the return optical signals.

22. An optical monitoring system, comprising an optical fiber, said fiber comprising a plurality of partially reflective and partially transmissive elements;

an optical source disposed to launch an input signal into said fiber, said source further comprises:

a laser for emitting light;

a modulator;

first coupler, disposed in a path of the light emitted by the laser between the laser and the modulator, for picking off a portion of the light emitted by the laser a second coupler for picking off portions of the return optical signals reflected from said elements; and a detector effective, responsive to said second coupler, to determine the phase of at least a portion of said signal reflected from said at least one of said elements, wherein the detector further comprises a third coupler for coherently mixing the portion of the light picked off by the first coupler with the portions of the return optical signals picked off by the second coupler.

* * * * *